H. C. SNOOK & E. W. KELLY.
STEREOSCOPIC APPARATUS.
APPLICATION FILED AUG. 2, 1910.
997,338.
Patented July 11, 1911.
2 SHEETS—SHEET 2.
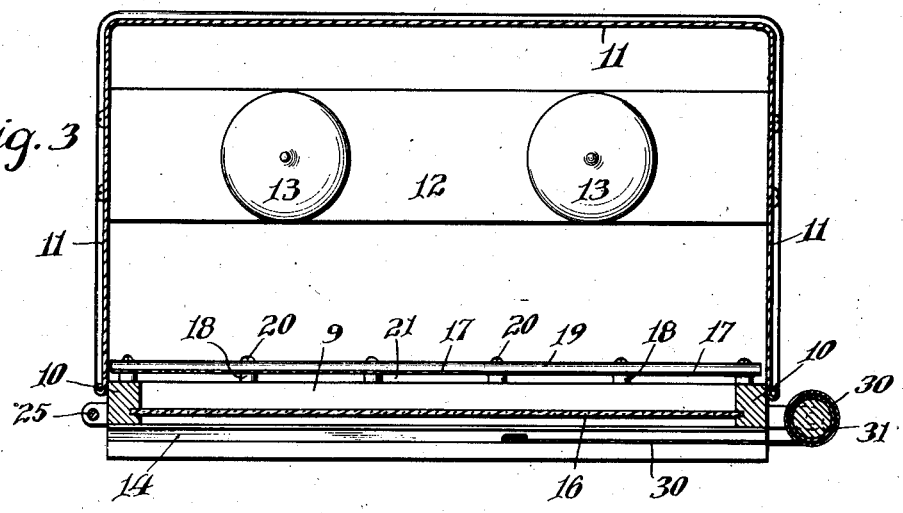
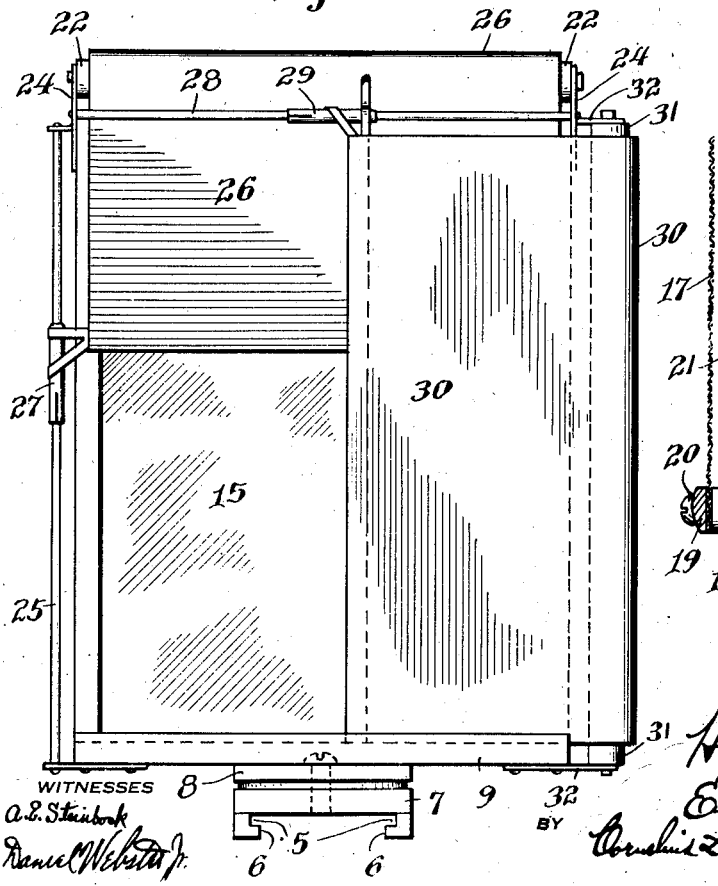
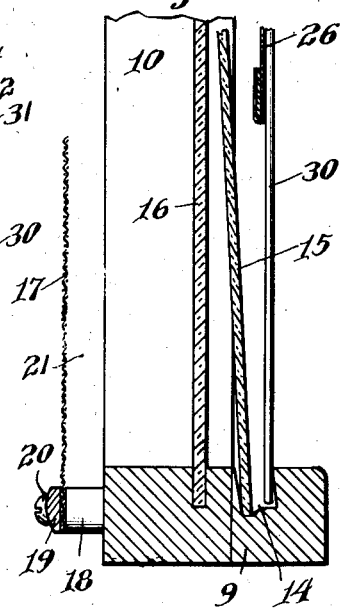
INVENTORS
Homer Clyde Snook
and
Edwin W. Kelly
BY Cornelius D. Ehret
their ATTORNEY
WITNESSES

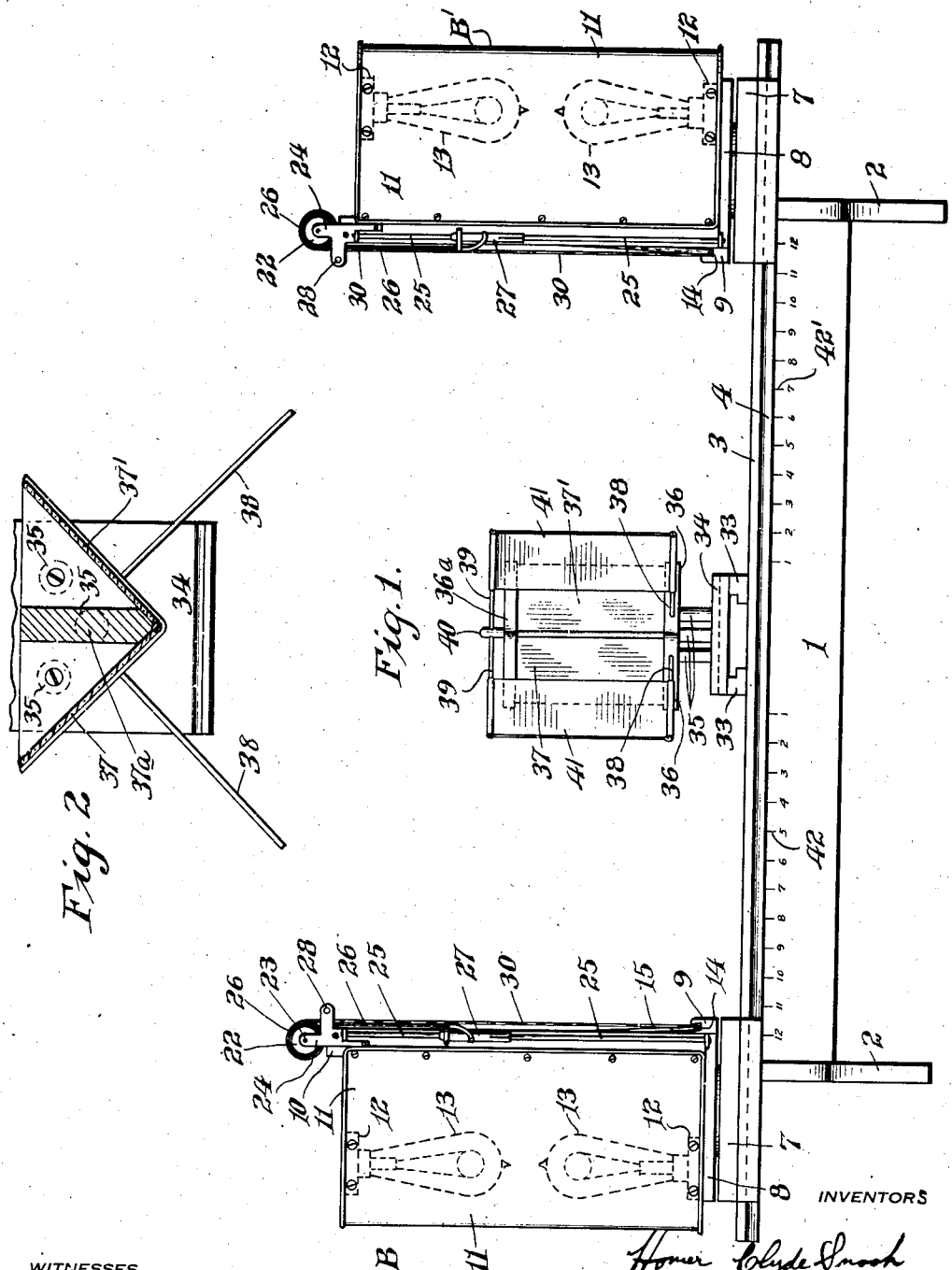

UNITED STATES PATENT OFFICE.

HOMER CLYDE SNOOK AND EDWIN W. KELLY, OF PHILADELPHIA, PENNSYLVANIA.

STEREOSCOPIC APPARATUS.

997,338.   Specification of Letters Patent.   Patented July 11, 1911.

Application filed August 2, 1910. Serial No. 575,066.

*To all whom it may concern:*

Be it known that we, HOMER CLYDE SNOOK and EDWIN W. KELLY, citizens of the United States, residing at Philadelphia, in the county of Philadelphia and State of Pennsylvania, have invented new and useful Improvements in Stereoscopic Apparatus, of which the following is a specification.

Our invention relates to apparatus whereby stereoscopic photographic or radiographic plates or prints or transparencies may be viewed and examined.

Our invention resides in stereoscopic apparatus, such as above referred to, and particularly to stereoscopic apparatus for use in the examination of plates or negatives taken by X-rays or other radiations; and the features of our invention are hereinafter described and claimed.

For an illustration of one of the forms our invention may take, reference is to be had to the accompanying drawings, in which:

Figure 1 is a side elevational view of the stereoscopic apparatus. Fig. 2 is a top plan view, partly in section, of the mirror apparatus. Fig. 3 is a horizontal sectional view through one of the view boxes, some parts being shown in plan. Fig. 4 is a front elevational view of a view box. Fig. 5 is a fragmentary vertical sectional view of a view box, some parts in elevation.

Referring to Fig. 1, B and B' represent two view boxes supported upon the longitudinally extending table 1 provided with supports or legs 2. Upon the top of the table 1 is provided the board or member 3, longitudinally grooved on each side at 4. The member 3 is embraced by the grooves 5, 5, Fig. 4, while the tongues 6, 6 engage in the front and rear grooves 4, whereby the blocks 7 may be adjusted longitudinally of the table 1. Pivoted upon each block 7 upon a vertical axis is a block or member 8 to which is secured the strip or member 9 extending transversely to the table 1, as viewed in Fig. 1. And secured to the member 8 are the vertical members 10 upon which is supported the three sided box member 11, open at top and bottom, and preferably made of sheet metal enameled or painted white upon the interior surfaces for reflecting light toward the plate or negative. Extending across the top and bottom of each box 11 is a strip 12 of wood or other suitable insulating material upon which are supported incandescent lamps 13 or other suitable sources of light, suitable electrical or other connections being made to these light sources. The members 9 are grooved longitudinally as indicated at 14, the sides of the groove being inclined to the vertical, so that the negative or photographic plate 15, having thereon an image to be viewed, will be slightly inclined from the vertical to rest safely against the apparatus.

Intervening between the negative or plate 15 and the light sources 13 is disposed a ground or frosted glass, or other translucent material 16, supported in the members 9 and 10. And intervening between the ground glass 16 and the light sources 13 is disposed a sheet of translucent material, such as tracing linen 17, supported at some distance from the frame formed by the parts 9 and 10, upon studs or buttons 18 held thereto by strips 19 secured by screws 20. It will be noted that gaps 21 exist between the translucent member 17 and the supporting frame therefor, both at the bottom and at the top, whereby the air heated by the light sources can readily pass up between the translucent members 16 and 17 and out at the gaps at the top whereby the temperature is maintained low and far below a temperature injurious to either members 16 and 17 or any other parts.

Across the top of the frame 10, 10 extends a curtain roller 22 pivoted at 23 in the brackets 24, and a vertical rod 25 is disposed on one side of the view box. A vertically movable curtain 26 is rolled upon the roller 22, which has within it a spring, not shown, for rolling the curtain up upon the roller. At one side of the vertically movable curtain is provided a split tube 27 embracing the rod 25 and engaging the same frictionally, the friction being sufficient to hold the curtain in any of its vertical positions, no pawl or locking device being provided for the spring roller 22. Extending horizontally across the top of the view box and supported in the brackets 24 is the horizontal rod 28 with which frictionally engages a split tube 29, similar to 27, upon the end of the horizontally movable curtain 30, which is rolled up on roller 31 pivoted in brackets 32, the roller 31 being similar to roller 22, as to its spring control. The friction of the tube 29 upon rod 28 is sufficient to hold the curtain 30 in any of its adjusted positions in opposition to the roller spring. The horizontally movable curtain 30 has its lower edge movable transversely in the slot 14. By adjusting the curtains 26 and 30 to any desired positions, they may be brought to the edges of a negative or plate of any desired size, thus shutting off the light from the sources 13 through everything except the plate or negative.

At the middle of the member 3 are mounted the members 33 on which slides transversely to the table 1, the member 34 carrying the vertical pins 35 supporting the member 36 supporting in turn the vertically extending member 37ª upon which is supported a member 36ª similar to the member 36. Upon the members 36, 36ª are mounted the mirrors 37, 37' disposed substantially at right angles to each other and at 45 degrees to the longitudinal axis of the table 1. Normally to the mirror surfaces extend the horizontal rods 38 at the bottom of the mirrors, and approximate the tops of the mirrors are similar rods 39 carried by post 40. Upon each pair of rods 38, 39 is a curtain 41, each adjustable longitudinally of its supporting rods toward or away from the mirrors 37 or 37'.

The view boxes B and B' are pivoted, as aforesaid, so that the boxes may be rotated to have the negatives face the front of the table, so that they may be examined independently of each other.

The operation of the apparatus is as follows: An exposure is made upon one plate with the X-ray tube in a given position; the object radiographed is then placed in the same position with respect to a second plate, which is then exposed after the X-ray tube has been moved a distance of substantially 2⅝ inches, the average distance between the human eyes. When these plates are developed they are slid into the slots 14 of the respective view boxes B and B', and the curtains 26 and 30 adjusted to their edges. The current is turned on to the electric lights 13, or the other light sources are lighted or energized, whereupon diffused light is thrown through the images on the two plates or negatives which are symmetrically disposed on both sides of the mirrors 37, 37' which are adjusted transversely to the table until the two images appear superimposed. The view boxes B and B' are adjusted along the table 1 by aid of the scales 42, 42' engraved or marked thereon to such points on the scale that will bring the negatives the same distance from the observer's eyes (measured from the eyes to the mirrors 37, 37' and thence to the negatives or plates) as the distance between the target of the X-ray tube and the plates during the exposures. The observer may move the curtains 41 toward or away from their respective mirrors to shut off any undesired light from sources other than the sources 13.

What we claim is:

1. The combination with a table, of view boxes movable longitudinally thereof, means for associating a plate or negative with each view box, mirrors disposed between said view boxes, and scales between said mirrors and said view boxes for determining the optical distance from said plates or negatives to the eyes of the observer via said mirrors.

2. In apparatus of the class described, a table, supports for image plates or negatives on said table, observing mirrors disposed at an angle with respect to each other and between said plate or negative supports, a support for said mirrors movable transversely of said table, and scales between said mirrors and said plate supports for determining the optical distance via said mirrors from the image plates or negatives to the eyes of the observer.

3. In apparatus of the class described, a table, view boxes comprising supports for image plates or negatives and sources of light, means for pivoting said view boxes upon said table, supports for said view boxes movable longitudinally of said table, mirrors disposed at an angle with respect to each other and located between said view boxes, a support for said mirrors movable transversely of said table, and scales between said mirrors and said view boxes for determining the optical distance via said mirrors from the image plates or negatives to the eyes of the observer.

4. In stereoscopic apparatus of the character described, a plurality of separated view boxes, a plurality of mirrors disposed at an angle with respect to each other between said view boxes, means for supporting curtains in planes at right angles to the planes of said mirrors, and curtains movable upon said supports.

5. A view box of the character described comprising a supporting frame adapted to support a plate or negative, an associated source of light, a translucent member supported within said frame, a second translucent member supported on and at a distance from the edge of said frame, the space between said translucent members communicating freely with the air at the bottom and at the top of said space, said separated translucent members intervening between said light source and said plate or negative.

6. A view box of the character described comprising a supporting frame adapted to support a plate or negative, an associated source of light, a translucent plate supported by and within said frame, and a translucent fabric supported by and at a distance from the edge of said frame, said translucent members intervening between said source of light and said plate or negative.

7. In a view box, of the character described, the combination with a frame, of means associated therewith for supporting a plate or negative, a spring-wound curtain supported upon one side of said frame, and frictionally engaging members for holding said curtain in adjusted position with respect to said plate or negative.

8. In a view box of the character described, the combination with a frame, of means associated therewith for supporting a plate or negative, and a pair of curtains supported respectively on different sides of said frame and adjustable in directions at right angles to each other with respect to said plate or negative.

9. In a view box of the character described, the combination with a frame, of means associated therewith for supporting a plate or negative, a pair of spring-controlled curtains mounted on different sides of said frame and adjustable in directions at right angles to each other with respect to said plate or negative, said curtains movable in parallel but different planes, and frictionally engaging members for holding said curtains in adjusted positions.

10. In a view box, the combination with a casing, of a light source therein, a negative or plate supporter, a frosted or ground glass intervening between the plate or negative and said light source, and a translucent cloth intervening between said plate or negative and said light source.

11. In a view box, the combination with a casing, of a light source therein, a negative or plate supporter, a frosted or ground glass intervening between the plate or negative and said light source, and a translucent cloth intervening between said plate or negative and said light source, said cloth and glass being separated by ventilation gaps.

12. In a view box, the combination with a plate or negative supporting frame, of a light source, a member inclosing said light source, except on the side toward the plate or negative, the inner surfaces of said inclosing member serving to reflect light, and a translucent member carried by said frame and intervening between said light source and the plate or negative.

13. In a view box, the combination with a plate or negative supporting frame, of a light source, a member inclosing said light source except on the side toward the plate or negative, the interior surfaces of said inclosing member serving to reflect light, a plurality of translucent members supported one within and another at a distance from said frame and intervening between said light source and the plate or negative, and ventilating gaps between said translucent members.

14. In a view box of the character described, the combination with a frame, of means associated therewith for supporting a plate or negative, a three-sided member secured to said frame at its two free edges, sources of light supported by said three-sided member, and a translucent member supported by said frame and intervening between said light sources and said plate or negative.

15. In a view box, the combination with a supporting frame, of means associated therewith adapted to support a plate or negative, a source of light, a three-sided member inclosing said light source and secured at its two edges to said frame, a translucent member intervening between said light source and the plate or negative and supported by said frame, and a curtain supported on said frame on the side of said translucent member away from said light source, said curtain adapted to be adjusted with respect to the plate or negative.

16. In a view box, the combination with a plate or negative supporter, of a plurality of light sources, a member inclosing said light sources on all sides except toward the plate or negative, the interior surfaces of said member serving to reflect light, and a plurality of translucent members separated by an air ventilating gap intervening between said light sources and the plate or negative.

17. In apparatus of the class described for viewing separate images in stereoscopic relation, mirrors disposed at an angle with respect to each other, view boxes on opposite sides of said mirrors, said view boxes each comprising a plate or negative supporter, a support for said view boxes and said mirrors, means for moving said mirrors transversely to said support, means for moving said view boxes longitudinally of said support, and a source of light movable with each view box and disposed on the side of the plate or negative opposite to the associated mirror.

18. In apparatus of the class described, the combination with a table, of mirrors disposed at an angle with respect to each other upon said table, view boxes disposed upon said table upon opposite sides of said mirrors, each view box comprising a plate or negative supporter, curtains movable with respect to the plate or negative and at right angles to each other, one of said curtains being movable transversely of said table, and means for adjusting said mirrors transversely of said table.

In testimony whereof we have hereunto affixed our signatures this 30th day of July, 1910, in the presence of the two subscribing witnesses.

HOMER CLYDE SNOOK.
EDWIN W. KELLY.

Witnesses:
ELEANOR T. McCALL,
ANNA E. STEINBOCK.